United States Patent [19]

Turetsky

[11] 4,178,250

[45] Dec. 11, 1979

[54] FILTER-PURIFIER CARTRIDGE HAVING MANUALLY SEPARABLE ELEMENTS

[76] Inventor: Isadore Turetsky, 23940 Welby Way, Canoga Park, Calif. 91307

[21] Appl. No.: 2,547

[22] Filed: Jan. 10, 1979

Related U.S. Application Data

[63] Continuation-in-part of Ser. No. 910,029, May 26, 1978, abandoned.

[51] Int. Cl.² ............................................. B01D 27/08
[52] U.S. Cl. ..................................... 210/315; 210/450
[58] Field of Search ............... 210/295, 315, 337–339, 210/342, 347, 450, 451, 457, 458

[56] References Cited

U.S. PATENT DOCUMENTS

| | | | |
|---|---|---|---|
| 2,781,912 | 2/1957 | Newcum | 210/295 |
| 3,132,501 | 5/1964 | Jacobs et al. | 210/314 X |
| 3,262,570 | 7/1966 | Gallitis et al. | 210/315 X |
| 3,357,563 | 10/1967 | Sicard | 210/315 X |
| 3,455,459 | 7/1969 | Troy | 210/315 |

Primary Examiner—William A. Cuchlinski, Jr.

[57] ABSTRACT

A filter-purifier cartridge arranged so that a manually separable purifier element is inserted into the hollow core of a pervious tubular filter, said hollow core communicating with the inlet of the purifier element; the inlet and outlet passages of the purifier element arranged to permit axial flow through the hollow core containing the purifying medium in said purifier element, in combination with radial flow through the tubular filter; the purifying medium within the hollow core of said purifying element being confined between two pervious members.

5 Claims, 4 Drawing Figures

FILTER-PURIFIER CARTRIDGE HAVING MANUALLY SEPARABLE ELEMENTS

FIELD OF THE INVENTION

This invention relates to a filter-purifier cartridge, and since it finds particular utility in the field of water filtration and purification, embodiments hereinafter described as illustrative of the invention and the advantages thereof are understood to be not restricted to such use. This application is a continuation-in-part of my prior application, Ser. No. 910,029 filed May 26, 1978, now abandoned and entitled "A FILTER-PURIFIER CARTRIDGE HAVING SEPARABLE ELEMENTS".

There is a growing demand for an inexpensive filter element that can be periodically discarded, in combination with an economical purifying element. Both the efficiency and life of a combined filter and purifier cartridge depend on the quantity of purifying medium used and the surface area of the filter. In present types of filter-purifier cartridges the fluid does not flow uniformly through the purifying medium, whereas in an axial flow assembly the relatively small surface area of the filter decreases the life expectancy of the cartridge.

OBJECTS OF THE INVENTION

An object of my invention is to provide a filter-purifier cartridge consisting of manually separable filter and purifier elements which can be removed when filtering efficiency is impaired and replaced by a new manually assembled cartridge.

Another object of my invention is the provision for manual removal of an impaired filter element and placing of a new filter element. In addition, the provision for changing the purifying medium within the purifier element for new purifying medium, resulting in a marked savings as compared to a throw away unit.

Another object of my invention is to facilitate adapting a filter-purifier cartridge to differing housings by having at least one manually separable end member which can be modified or exchanged for a proper fitting end member.

Still another object of my invention is to combine the efficiency offered by radial flow through the filter element with an axial flow through the purifier element.

Embodiments of my invention capable of accomplishing the foregoing objects and providing the advantages contemplated by them and other advantages will become more apparent after studying the detailed description of the following specification which may be readily understood by reference to the accompanying drawings.

DETAILED DESCRIPTION OF THE DRAWINGS

Figure 1:
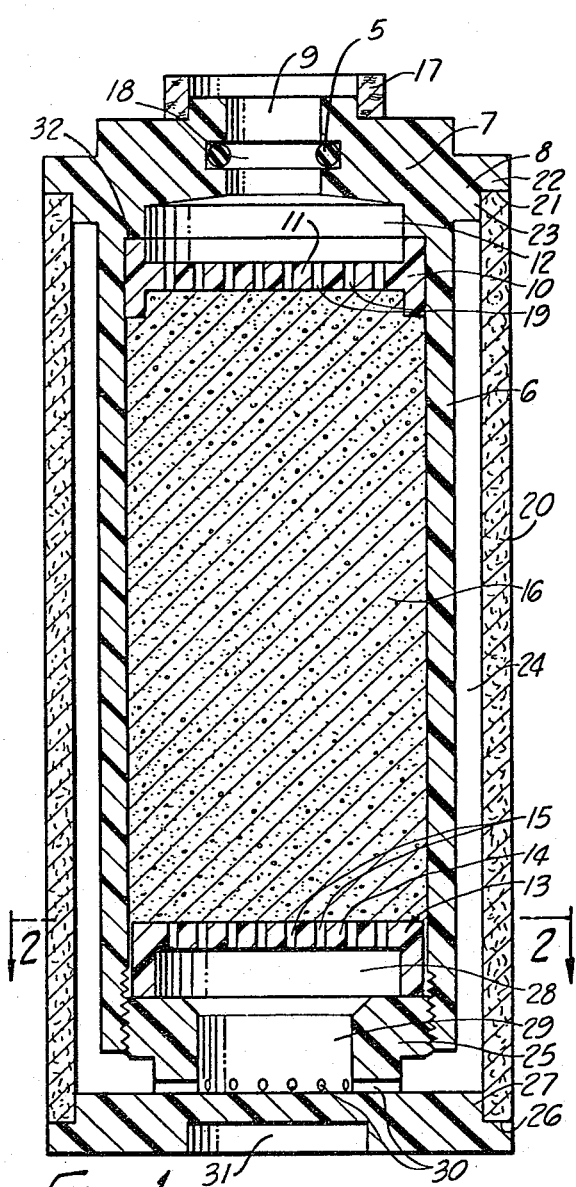
FIG. 1 is a side elevation sectional view of an integrated filter-purifier cartridge of my invention.

Referring to FIG. 1 which is for illustrative purposes only, the numeral 6 indicates the hollow cylinder of the purifier element, said hollow cylinder having a top wall 7 and a step flange 8 at its upper end. A concentric circular passage 9 through the top wall 7 communicates with the fluid stream within the hollow core of cylinder 6. The tube 10 has an integral perforated disk 11 within its hollow core and intermediate its ends. The tube 10 is a sliding fit in the hollow core of cylinder 6 and is contiguous to the internal shoulder 32. The chamber 12 below the top wall 7 communicates with the passage 9 in said top wall. The inverted cup 13 has a sliding fit in the hollow core of cylinder 6 and is inserted into the lower section of said hollow cylinder; the inverted bottom 14 of said cup 13 having a series of perforations 15. The purifying medium 16 contained within the hollow core of cylinder 6 is confined between the inverted perforated bottom 14 of the cup 13 and the perforated disk 11 within the tube 10. The lower end section of the hollow cylinder 6 is internally threaded, preferably with a straight thread. While not essential to the successful operation of the device it is preferred that the internally threaded section at the lower end of cylinder 6 be recessed so as to facilitate insertion and removal of the perforated members within the hollow core of said cylinder 6. A ring gasket 17 is positioned on the top wall 7 and around the passage 9, said passage 9 being the discharge passage of the cartridge and the purifier element. An optional "O" ring retaining groove 18 within the top wall 7 and encircling the passage 9 can be used to retain an "O" ring 5 for a purpose to be described later. An optional permeable porous disk (not shown) can be disposed between the internal shoulder 32 and the tube 10; said permeable porous disk will serve to confine particles that may escape through the perforations 19 in disk 11. The lower section of the cylinder 6 is inserted into the hollow core of the pervious tubular filter element 20 so that one end of said tubular filter element rests against the shoulder 21 of the larger circumferential section of the step flange 22, the adjacent smaller circumferential section 23 of said step flange 22 being inserted into the hollow core of the tubular filter element 20; said end of the tubular filter element being sealed by said shoulder 21, and the inserted section 23 of the step flange 22. The inserted section 23 of the step flange 22 also spaces the hollow cylinder 6 from the side wall of the tubular filter element 20 thereby forming the annular channel 24. The manually separable lower end closure is a step flanged hollow core threaded adapter plug 25 which is aligned and joined by threaded means to the internally threaded end section of the hollow cylinder 6, the flange shoulder 26 and the smaller circumferential flange step section 27 sealing and spacing the adjacent end of the pervious tubular filter element 20. The threaded adapter plug 25 is contiguous to and confines the inverted cup 13 within the lower section of the hollow cylinder 6, the chamber 28 within said inverted cup 13 facing and communicating with the hollow core 29 of the step flanged adapter plug 25. The annular channel 24 communicates with the fluid stream within the core of hollow cylinder 6 by the use of a series of radial passages 30 which are circumferentially disposed within a section of the step flanged hollow cored threaded adapter plug 25, said annular channel 24 communicating with the hollow core 29 in the adapter plug 25 by means of said radial passages 30. The hollow core step flanged threaded adapter plug 25 will also transmit axial compressive stress through the wall of the hollow cylinder 6, and the tubular filter element 20. The circular recess 31 of the adapter plug 25 can be used to align the cartridge within its housing. Should the cartridge housing require a specific recess or contour of the removable lower end closure, an appropriate closure can be installed using the same cartridge.

In operation the filter-purifier cartridge as shown is subjected to axial compression after said cartridge is inserted in its housing. The housing is not part of my invention and is not shown. It will be evident that, while the filter housing is not illustrated, one skilled in the art can adapt the illustrated cartridge to a cylindrical housing having axially aligned inlet and outlet passages. One skilled in the art will also note that embodiments of the cartridge as shown are adapted to a common type of filter housing which is screwed onto a double ported end section containing an "O" ring to seal the single open end of said housing. In some filter housing assemblies the discharge port of the double ported end section consists of a hollow cylindrical extension which is used to align the cartridge within the housing. This hollow cylindrical extension can be inserted into a properly sized cartridge discharge passage 9 after "O" ring 5 is placed in the optional "O" ring retaining groove 18 within the top wall 7, thereby making a pressure seal with the outside wall of said hollow cylindrical extension. This procedure would obviate the need for ring gasket 17.

One skilled in the art can adapt a removable top wall at the upper end section of the purifier element, and also adapt axial or inclined passages to be used in conjunction with a coreless separable cartridge end closure.

With the cartridge in use, the fluid flows through the pervious wall of the tubular filter element 20, into the annular channel 24, through the passages 30 and into the hollow core 29 of the step flanged adapter plug 25, into the chamber 28 of the inverted cup 13, through the perforations 15 of the inverted bottom of said cup and through the hollow core containing the purifying medium 16, through the chamber 12 via the perforations 19 in disk 11, and exits through the discharge passage 9, said discharge passage 9 communicating with the discharge passage of the cartridge housing. The ring gasket 17 surrounding the cartridge discharge passage 9 and the cartridge housing discharge passage prevents any unprocessed liquid from being discharged through the cartridge housing discharge passage.

Figure 3:
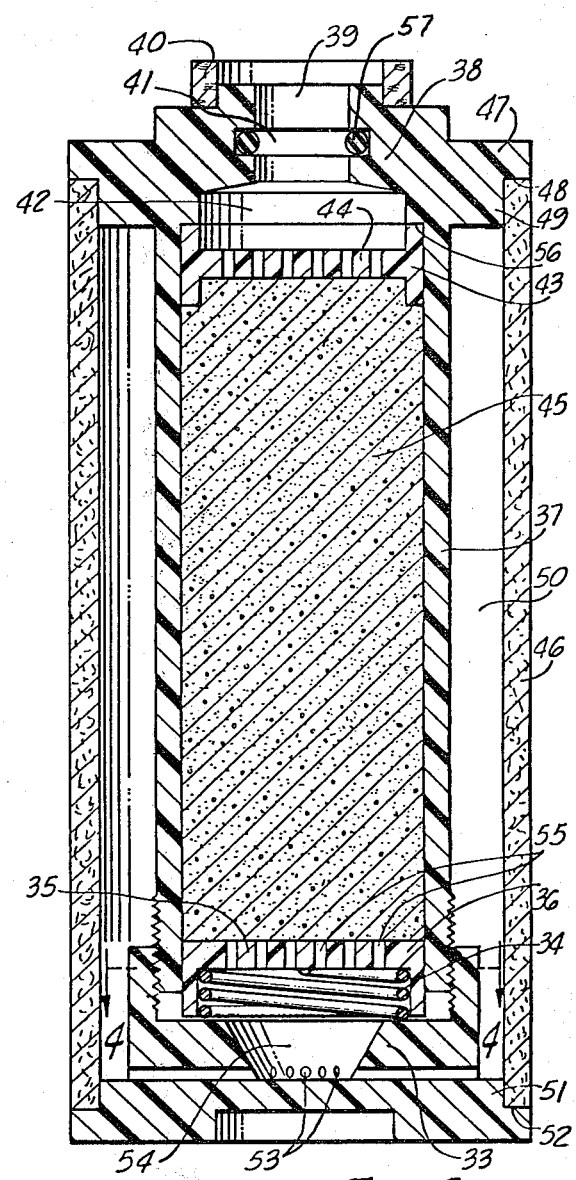
FIG. 3 is generally similar to FIG. 1, but illustrates another form of a manually separable end closure compressing an optional spring, and a modified purifier element lower end section.
Figure 2:
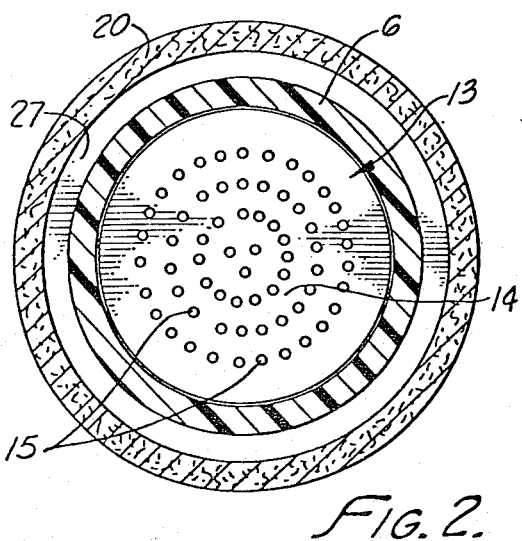
FIG. 2 is a horizontal cross-section of the cartridge of FIG. 1 taken along the line 2—2.
Figure 4:
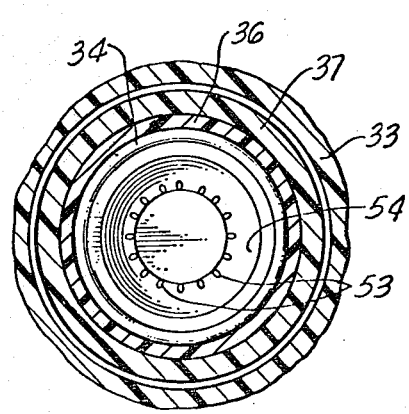
FIG. 4 is a horizontal cross-sectional view of the cartridge of FIG. 3 taken along the line 4—4.

The construction shown in FIG. 3 is generally like that of FIG. 1 but uses a separable step flanged threaded cap adapter 33 for an end closure, and compressing the spring 34 confined between the inverted perforated bottom 35 of the cup 36 and the internal flat wall of said threaded cap adapter 33. The hollow cylinder 37 of the purifier element is externally threaded (preferably straight threaded) at its lower end section which is joined to the internally threaded cap adapter 33. The upper section of the hollow cylinder 37 has a top wall 38, a concentric passage 39 through said top wall, a ring gasket 40, disposed on said top wall and surrounding said passage 39, an optional "O" ring 57 retained in groove 41 within said top wall 38 and encircling said passage 39, a chamber 42 communicating with said passage 39, a tube 43 having an integral perforated disk 44 intermediate the ends of said tube, said tube 43 contiguous to the internal shoulder 56. The purifying medium 45 is contained within the hollow core of the cylinder 37 and is confined between the perforated disk 44 and the perforated inverted bottom 35 of the cup 36. The cylinder 37 is inserted into the hollow core of the pervious tubular filter element 46 so that one end of said filter element is sealed and spaced by means of the step flange 47 at the upper end section of said cylinder 37, said end of the tubular filter element resting against the shoulder 48 of the larger circumferential section of the step flange 47, the smaller circumferential section 49 of said step flange 47 being inserted into the end section of the tubular filter element 46 thereby spacing the cylinder 37 from the sidewall of the tubular filter 46 to form the annular channel 50. The step flanged threaded cap adapter end closure 33 is joined to the lower end section of the hollow cylinder 37 by threaded means, being screwed onto the externally threaded lower end section of said hollow cylinder 37 thereby compressing the optional spring 34. The step flanged threaded adapter cap end closure also spaces and seals the adjacent end of the tubular filter by means of the smaller circumferential flange step section 51 which is inserted into the hollow core of the pervious tubular filter 46, and the step flange shoulder 52 which rests against the end wall of said tubular filter. A series of radial passages 53 circumferentially disposed in a section of the step flanged threaded adapter cap end closure communicates with the hollow core 54 of said adapter cap 33, said hollow core 54 being a passage within the adapter cap for the fluid stream entering the core of cylinder 37. The annular channel 50 communicates with the hollow core of the cylinder 37 by means of the passages 53 and passage (hollow core) 54. The compressed optional spring 34 maintains a compacting pressure on the purifying medium 45 contained in the hollow core of cylinder 37.

In use, fluid flows through the pervious tubular filter element 46 into the annular channel 50, through the radial passages 53 and into the hollow core 54 of the step flanged adapter cap 33, through perforations 55 in the inverted bottom of cup 36, through the hollow core containing the purifying medium 45, into chamber 42 via the perforations of disk 44, and thence through the cartridge discharge passage 39 and into the cartridge housing discharge passage (not shown.)

The present invention contemplates alternate embodiments which can include a fiber winding on a reticulated or perforated core as a tubular filter element. A pleated resin impregnated filter paper formed around a perforated core, or formed around the cylindrical purifier element with modified end sections to contain said pleated filter paper can be used as a tubular filter element. Also, a removable permeable sheath can be wound around the pervious tubular filter element.

The present invention contemplates the use of slip fit adapter end closures obviating the need for threaded members.

It will be obvious to one skilled in the art that the hollow purifier can be extended above its stepped flange so that a noticeable portion of said purifier element is not enclosed by the pervious tubular filter; this exposed extended section can be concentrically enlarged and contain a separable top wall. In addition, one skilled in the art can adapt a circular wall projecting from the outer extremity of each stepped flange, said wall being used to encircle and radially space the end sections of the pervious tubular filter element.

While those embodiments of this invention hereinbefore illustrated and described are fully capable of performing the objects and accomplishing the advantages primarily stated, it will be understood that this invention is not restricted to the specific embodiments hereinbefore set forth, but includes all modifications coming within the scope of the claims that follow.

I claim:

1. A filter-purifier cartridge for liquids having manually separable elements adapted to be inserted in a filter apparatus, comprising: a pervious tubular filter element adapted for radial flow therethrough, a manually separable hollow cylindrical purifier element having inlet and outlet means for flow of fluid therethrough, and containing a purifying medium confined between two foraminous members within the hollow core of said purifier element; said purifier element having a top wall, a concentric discharge passage through said top wall, said passage communicating with the fluid stream within said purifier element; a stepped flange located at the upper end section of the purifier element, said purifier element inserted into the hollow core of said tubular filter element, one end of said tubular filter being sealed and radially spaced from the main body of said purifier element by means of said stepped flange at the upper end section of said purifier element, thereby forming an intermediate annular channel; the remaining exposed end of said filter element being sealed and maintained in spaced relationship with said purifier element by means of a manually separable cartridge end closure which is aligned and joined to the lower end section of said purifier element, said end closure having a hollow core and a series of radial passages communicating with said hollow core; the annular channel communicating with the fluid stream within said purifier element by means of said radial passages and the hollow core within said end closure.

2. The invention defined in claim 1, in which the end closure has a stepped flange to seal and space the adjacent end of said tubular filter element.

3. The invention defined in claim 1, in which the exposed end of the top wall contains a frictional seal surrounding the discharge passage through said top wall.

4. The invention defined in claim 1, wherein a chamber exists between the top wall and the upper foraminous member confining the purifying medium within said purifier element.

5. The invention defined in claim 1, wherein said foraminous members within the hollow core of the purifier element are adapted for insertion in and removal from said purifier element.

* * * * *